US012811928B2

(12) United States Patent
Yoo

(10) Patent No.: US 12,811,928 B2
(45) Date of Patent: Nov. 24, 2026

(54) INDUSTRIAL CONTROL APPARATUS FOR PERFORMING DYNAMIC AUTHENTICATION CODE-BASED AUTHENTICATION, AND METHOD USING SAME

(71) Applicant: SSenStone Inc., Seoul (KR)

(72) Inventor: Chang Hun Yoo, Seoul (KR)

(73) Assignee: SSenStone Inc., Seoul (KR)

( * ) Notice: Subject to any disclaimer, the term of this patent is extended or adjusted under 35 U.S.C. 154(b) by 17 days.

(21) Appl. No.: 18/818,080

(22) Filed: Aug. 28, 2024

(65) Prior Publication Data

US 2024/0422154 A1 Dec. 19, 2024

Related U.S. Application Data

(63) Continuation of application No. PCT/KR2023/002906, filed on Mar. 3, 2023.

(30) Foreign Application Priority Data

Mar. 4, 2022 (KR) ........................ 10-2022-0027972
Mar. 2, 2023 (KR) ........................ 10-2023-0027463

(51) Int. Cl.
*H04L 9/40* (2022.01)

(52) U.S. Cl.
CPC .................................. *H04L 63/083* (2013.01)

(58) Field of Classification Search
CPC ..................................................... H04L 63/083
USPC .......................................................... 726/5–6
See application file for complete search history.

(56) References Cited

U.S. PATENT DOCUMENTS 7,363,494 B2 * 4/2008 Brainard ............... H04L 9/3297 713/168
7,546,130 B2 6/2009 Vance
8,370,638 B2 * 2/2013 Duane ..................... G06F 21/34 713/168

(Continued)

FOREIGN PATENT DOCUMENTS

JP 2007-235558 A 9/2007
JP 2012-034179 A 2/2012

(Continued)

OTHER PUBLICATIONS

International Search Report issued in PCT/KR2023/002906; mailed Jun. 5, 2023.

(Continued)

*Primary Examiner* — Benjamin R Bruckart
(74) *Attorney, Agent, or Firm* — Studebaker Brackett PLLC

(57) ABSTRACT

Provided are an industrial control apparatus for performing dynamic authentication code-based authentication, and a method using same. The industrial control apparatus according to the present disclosure comprises: a communication module for performing communication with a user terminal and a central server; and a central processing unit (CPU) that requests authentication for a dynamic authentication code by transmitting the dynamic authentication code generated by the user terminal to the central server through the communication module, and changes an operating mode on the basis of a result of the authentication.

11 Claims, 8 Drawing Sheets

(56) References Cited

U.S. PATENT DOCUMENTS

| | | | | |
|---|---|---|---|---|
| 8,925,053 | B1 * | 12/2014 | Mehta | G06F 21/31 726/4 |
| 9,038,157 | B1 * | 5/2015 | Santiago, Jr. | G06F 21/35 726/9 |
| 11,146,962 | B2 | 10/2021 | Loreskär et al. | |
| 11,323,261 | B1 * | 5/2022 | Jibrin | G06V 40/1382 |
| 11,570,180 | B1 * | 1/2023 | Fitzpatrick | H04L 9/0643 |
| 2006/0211412 | A1 | 9/2006 | Vance | |
| 2008/0098464 | A1 * | 4/2008 | Mizrah | G06F 21/36 726/5 |
| 2012/0026996 | A1 | 2/2012 | Yamaguchi | |
| 2012/0210408 | A1 * | 8/2012 | Lu | H04L 9/3226 726/6 |
| 2014/0259116 | A1 * | 9/2014 | Birk | G06F 21/44 726/4 |
| 2014/0373170 | A1 * | 12/2014 | Brudnicki | G06F 21/604 726/27 |
| 2015/0312250 | A1 * | 10/2015 | Redberg | H04L 9/30 726/6 |
| 2016/0055322 | A1 * | 2/2016 | Thomas | H04L 63/0876 726/7 |
| 2016/0112412 | A1 * | 4/2016 | Roth | G06F 21/34 726/6 |
| 2017/0310487 | A1 * | 10/2017 | Lu | H04L 9/3263 |
| 2019/0200218 | A1 * | 6/2019 | Redberg | H04L 9/12 |
| 2020/0051065 | A1 * | 2/2020 | Yoo | G06Q 20/351 |
| 2020/0320526 | A1 * | 10/2020 | Yoo | H04L 9/3234 |
| 2020/0351652 | A1 | 11/2020 | Loreskär et al. | |
| 2022/0210652 | A1 | 6/2022 | Loreskar et al. | |

FOREIGN PATENT DOCUMENTS

| | | | |
|---|---|---|---|
| KR | 10-2005-0053857 | A | 6/2005 |
| KR | 10-2008-0013852 | A | 2/2008 |
| KR | 10-2010-0030641 | A | 3/2010 |
| KR | 10-1316466 | B1 | 10/2013 |
| KR | 10-2015-0065996 | A | 6/2015 |
| KR | 10-2021-0107555 | A | 9/2021 |
| KR | 10-2022-0002892 | A | 1/2022 |
| WO | 2022/186654 | A1 | 9/2022 |

OTHER PUBLICATIONS

The extended European search report issued by the European Patent Office on Mar. 19, 2025, which corresponds to European Patent Application No. 23763723.6-1218 and is related to U.S. Appl. No. 18/818,080.

An Office Action mailed by the Korean Ministry of Intellectual Property on Jun. 17, 2025, which corresponds to Korean Patent Application No. 10-2023-0027463 and is related to U.S. Appl. No. 18/818,080.

* cited by examiner

INDUSTRIAL CONTROL APPARATUS FOR PERFORMING DYNAMIC AUTHENTICATION CODE-BASED AUTHENTICATION, AND METHOD USING SAME

CROSS-REFERENCE TO RELATED APPLICATIONS

The present application is a continuation of International Patent Application No. PCT/KR2023/002906, filed on Mar. 3, 2023, which is based upon and claims the benefit of priority to Korean Patent Application No. 10-2022-0027972 filed on Mar. 4, 2022, and Korean Patent Application No. 10-2023-0027463 filed on Mar. 2, 2023. The disclosures of the above-listed applications are hereby incorporated by reference herein in their entirety.

BACKGROUND

Embodiments of the present disclosure described herein relate to an industrial control apparatus for performing dynamic authentication code-based authentication and a method using the same.

Code-type data are being used in numerous fields. In addition to a card number or an account number used to make a payment, the code-type data include an IPIN number or a resident registration number for user identification.

However, the code data are able to be leaked out in the process of using the code data. In the case of the card number, because an actual card number is recorded on a surface of the card as it is, the actual card number is visually perceived by any other people. When a payment using a magnet is made, the card number is leaked out while being transmitted to a POS apparatus.

A virtual code has been used to prevent the actual code from being leaked out. However, data for identifying a user are required to search for the actual code corresponding to the virtual code.

However, a one-time password (OTP) is inconvenient because a separate OTP generator is required. In particular, a user terminal has security vulnerabilities due to the leakage of seed data used to generate the OTP.

Accordingly, even though the OTP code is generated as if a virtual security code necessary to authenticate the user is generated based on card data of the card possessed by the user, there is required a method for improving the security by preventing the leakage of seed data without requiring a separate OTP generator.

SUMMARY

Embodiments of the present disclosure provide an industrial control apparatus performing dynamic authentication code-based authentication and a method using the same.

According to an embodiment, an industrial control apparatus which performs dynamic authentication code-based authentication may include a communication module that performs communication with a terminal of a user and a central server, and a central processing unit (CPU) that transmits a request for authentication of a dynamic authentication code generated by the user terminal to the central server through the communication module and changes an operating mode based on a result of the authentication executed by the central server. The authentication may be to determine whether the authentication request corresponds to a normal access, based on the dynamic authentication code, and the dynamic authentication code may be received from the user terminal, may be by the user through an interface apparatus, or may be read through the interface apparatus.

Also, when it is determined that the authentication request corresponds to the normal access, the CPU may receive identification information of the user from the central server and may perform login processing based on the identification information.

In addition, the dynamic authentication code may include secret data of the user terminal, and the secret data may be used for the central server to search for the identification information.

Furthermore, the secret data may be a unique value which is generated by the central server when the user terminal requests registration from an application for controlling the industrial control apparatus and is allocated only to the user terminal to identify the user terminal.

Besides, the identification information may be a user identification (ID) which is input or generated by the user terminal when the user terminal requests registration from an application for controlling the industrial control apparatus.

Also, when the login is completed, the CPU may change the operating mode from a disable mode to an enable mode and may control at least one field equipment based on a control command received from the user terminal in a state of the enable mode.

According to an embodiment, an industrial control apparatus which performs dynamic authentication code-based authentication may include a communication module that performs communication with a terminal of a user, and a central processing unit (CPU). When authentication for a dynamic authentication code generated by the user terminal is requested, the CPU may change an operating mode based on an execution result of the authentication. The authentication may be to determine whether the authentication request corresponds to a normal access, based on the dynamic authentication code, and the dynamic authentication code may be received from the user terminal, may be input by the user through an interface apparatus, or may be read through the interface apparatus.

Also, when it is determined that the authentication request corresponds to the normal access, the CPU may perform login processing based on identification information of the user. When the login is completed, the CPU may change the operating mode from a disable mode to an enable mode and may control at least one field equipment based on a control command received from the user terminal in a state of the enable mode.

According to an aspect, a method which is performed by an industrial control apparatus to perform dynamic authentication code-based authentication may include transmitting a request for authentication of a dynamic authentication code generated by a terminal of a user to a central server, and changing an operating mode based on a result of the authentication performed by the central server. The authentication may be to determine whether the authentication request corresponds to a normal access, based on the dynamic authentication code. The dynamic authentication code may be received from the user terminal, may be input by the user through an interface apparatus, or may be read through the interface apparatus.

According to an aspect, a method which is performed by an industrial control apparatus to perform dynamic authentication code-based authentication may include performing, when authentication for a dynamic authentication code generated by a terminal of a user is requested, the requested authentication, and changing an operating mode based on an execution result of the authentication. The authentication may be to determine whether the authentication request corresponds to a normal access, based on the dynamic authentication code. The dynamic authentication code may be received from the user terminal, may be input by the user through an interface apparatus or may be read through the interface apparatus.

Besides, a computer program stored in a computer-readable recording medium for executing a method for implementing the present disclosure may be further provided.

In addition, a computer-readable recording medium for recording a computer program for performing the method for implementing the present disclosure may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
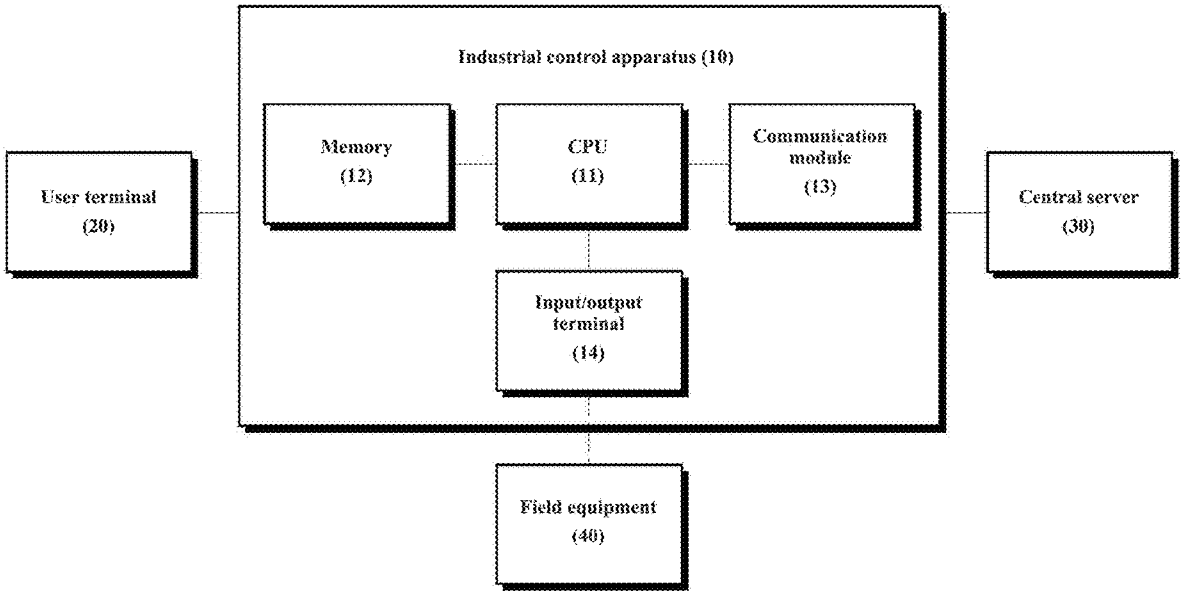
FIG. 1 is a diagram illustrating a security system of an industrial control apparatus using dynamic authentication code-based authentication according to an embodiment of the present disclosure.

The same reference numerals denote the same elements throughout the present disclosure. The present disclosure does not describe all components of embodiments, and the general content in the technical field to which the present invention pertains or the duplicated content between the embodiments is omitted. A term such as 'unit, module, member, or block' used in the specification may be implemented with software or hardware. According to embodiments, a plurality of 'units, modules, members, or blocks' may be implemented with one component, or a single 'unit, module, member, or block' may include a plurality of components.

Throughout this specification, when it is supposed that a portion is "connected" to another portion, this includes not only a direct connection, but also an indirect connection. The indirect connection includes being connected through a wireless communication network.

Also, when it is mentioned that a part "includes" a certain component, this means that any other component(s) may be further included, rather than excluding any other component(s), unless otherwise stated.

Throughout the specification, when a first member is described as being "on" a second member, it includes the case where a third member is present between the first and second members, as well as the case where the first member is in contact with the second member.

The terms such as first, second, etc. are used to distinguish one component from another component, and the components are not limited by the above terms.

A singular expression includes a plural expression, unless there are obvious exceptions in the context.

In each step, a reference sign is used for convenience of description, and the reference sign does not describe the order of respective steps. Each step may be carried out to be different from the specified order unless the specific order is clearly stated in the context.

Below, the operation principle and embodiments of the present disclosure will be described with reference to the accompanying drawings.

Below, embodiments of the present disclosure will be described in detail with reference to accompanying drawings.

Prior to a description, the meaning of terms used in the present specification will be described briefly. However, because the description of terms is used to help the understanding of this specification, it should be noted that if the inventive concept is not explicitly described as a limiting matter, it is not used in the sense of limiting the technical idea of the inventive concept.

In the specification, an "apparatus" includes all of various apparatuses capable of providing results to a user by performing arithmetic processing. For example, the apparatus according to the present disclosure may include all of a computer, a server apparatus, and a portable terminal or may be implemented in the form of any one thereof.

Herein, the computer may include, for example, a laptop, a desktop, a tablet PC, a slate PC, etc., which is equipped with a web browser.

The server apparatus which is a server processing information through the communication with an external apparatus may include an application server, a computing server, a database server, a file server, a game server, a mail server, a proxy server, a web server, etc.

The portable terminal which is a wireless communication apparatus ensuring portability and mobility may include all types of handheld-based wireless communication apparatuses such as a personal communication system (PCS), global system for mobile communications (GSM), a personal digital cellular (PDC), a personal handyphone system (PHS), personal digital assistant (PDA), international mobile telecommunication (IMT)-2000, code division multiple access (CDMA)-2000, wideband code division multiple access (W-CDMA), a wireless broadband Internet (WiBro) terminal, and a smartphone, and a wearable apparatus such as a watch, a ring, a bracelet, an anklet, a necklace, glasses, a contact lens, or a head-mounted device (HMD).

In the specification, a "character" is a component constituting a code and includes all or part of uppercase alphabet characters, lowercase alphabet characters, numerals, and special characters.

In the specification, a "code" refers to a string of characters.

In the specification, a "dynamic authentication code" may mean a one-time authentication code (OTAC) which is temporarily generated to authenticate at least one of a user and an apparatus.

In the specification, an "authentication code generation function" means a function of generating the dynamic authentication code. For example, one-time password (OTP), etc. are included therein, but the present disclosure is not limited thereto.

In the specification, a "detailed code generation function" means a function of generating each of detailed codes constituting the dynamic authentication code.

In the specification, the "detailed code combination function" means a function for generating a virtual code by combining or coupling a plurality of detailed codes.

In the specification, a "unit count" refers to a unit which is set to a specific time interval and is defined to change as the time interval passes. For example, 1 count may be set to a specific time interval (e.g., 1.5 seconds) and may then be used.

In the specification, a "storage location" means a point (count) on a track corresponding to a point in time when the registration of the user is requested.

In the specification, an "industrial control apparatus" may include, but is not limited to, a programmable logic controller (PLC), a supervisory control and data acquisition (SCADA), and an industrial control system (ICS).

Nowadays, cyber attacks targeting the industrial control system are increasing. Among components of the industrial control system, an industrial control apparatus (e.g., the PLC) is a core component taking charge of controlling and measuring site apparatuses (field equipment) of the industrial control system; in this case, the cyber attacks targeting the industrial control apparatus may cause the damage to the entire industrial control system. To prevent the above issue, a password (PW) authentication method, an ID/password (ID/PW) authentication method, and a PKI authentication method have been utilized. However, the password (PW) authentication method and the ID/password (ID/PW) authentication method have the problems that it is difficult to manage an ID/password (ID/PW) specified for each industrial control equipment and to additionally manage the situation that a user is changed, and are easily hacked by hackers by using password cracking software. The PKI authentication method has the problem that the authentication infrastructure cost is high, a two-way network environment is essential, and the certificate management is burdensome.

In detail, conventionally, only a password is often used; however, in this case, the access to an apparatus or the setting or control of an apparatus is possible only by stealing the password. Also, because only the password is entered, it is difficult to confirm which user accesses an apparatus or sets or controls an apparatus.

In addition, even though an ID and a password are used together, because both the ID and the password are fixed values, an issue such as stealing may occur.

Also, because the hardware specifications of the industrial control apparatus itself are not high, it may not be possible to use an authentication technology (e.g., the PKI) used in mobile equipment as it is, and because the industrial control apparatus needs to directly authenticate the user together a server, it is difficult to apply the authentication technology used in an existing mobile apparatus.

Accordingly, in the present disclosure, as an authentication method using a dynamic authentication code (one-time authentication code (OTAC)) is used, the industrial control apparatus may be protected from hacking risks, and it may be possible to have a competitive advantage in cost, system-required specifications, etc. compared to existing authentication methods.

Below, a security method of an industrial control apparatus using an industrial control apparatus 10, a user terminal 20, and a central server 30 will be described with respect to FIGS. 1 to 4.

FIG. 1 is a diagram illustrating a security system of an industrial control apparatus using dynamic authentication code-based authentication according to an embodiment of the present disclosure.

Referring to FIG. 1, a security system (hereinafter referred to as a "system") of an industrial control apparatus using dynamic authentication code-based authentication according to an embodiment includes the industrial control apparatus 10, the user terminal 20, the central server 30, and field equipment 40. However, in some embodiments, the system may include components, the number of which is less than or more than the number of components illustrated in FIG. 1.

The industrial control apparatus 10 plays a pivotal role in controlling site equipment (field equipment) in actual industrial sites.

Referring to FIG. 1, the industrial control apparatus 10 may include a central processing unit (CPU) 11, a memory 12, a communication module 13, and an input/output terminal 14. However, in some embodiments, the industrial control apparatus 10 may include components, the number of which is less than or more than the number of components illustrated in FIG. 1.

The CPU 11 may manage and control all operations of the industrial control apparatus 10.

The CPU 11 may perform a computing operation by using a signal, a command, information, and data received from external equipment.

The memory 12 may store data supporting various functions of the industrial control apparatus 10 and a program for an operation of the CPU 11, may store a plurality of input/output data, and may store various application programs (or applications) executable in the industrial control apparatus 10 of the present disclosure and a plurality of data and instructions for an operation of the industrial control apparatus 10. At least some of the application programs may be downloaded from an external server through the wireless communication.

The memory 12 described above may include a storage medium whose type corresponds to a type of at least one of a flash memory type, a hard disk type, a solid state drive (SSD) type, a silicon disk drive (SDD) type, a multimedia card micro type, a card type memory (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc, etc. Also, the memory 12 may be separated from the industrial control apparatus 10 of the present disclosure but may be used as a database connected in a wired or wireless manner.

The communication module 13 may include one or more modules which enable the wireless or wired communication between the industrial control apparatus 10 and the user terminal 20, between the industrial control apparatus 10 and the central server 30, between the industrial control apparatus 10 and the field equipment 40, and between the industrial control apparatus 10 and a communication network. For example, the communication module 13 may include at least one of a wired communication module, a wireless communication module, a short-range communication module, and a location information module.

Various types of communication networks may be used as the communication network. For example, there may be used a wireless communication method, such as wireless LAN (WLAN), Wi-Fi, Wibro, WiMAX, or high speed downlink packet access (HSDPA), or a wired communication method such as Ethernet, xDSL (ADSL or VDSL), hybrid fiber coax (HFC), fiber to the curb (FTTC), or fiber to the home (FTTH).

Meanwhile, the communication network is not limited to the communication methods disclosed above, and in addition to the above communication methods, the communication network may include any other communication methods which are widely known or are to be developed in future.

The wired communication module may include various cable communication modules such as a universal serial bus (USB), a high definition multimedia interface (HDMI), a digital visual interface (DVI), recommended standard232 (RS-232), power line communication, or a plain old telephone service (POTS), as well as various wired communication modules such as a local area network (LAN) module, a wide area network (WAN) module, or a value added network (VAN) module.

In addition to a Wi-Fi module and a wireless broadband module, the wireless communication module may include a wireless communication module which supports various wireless communication methods such as global system for mobile communication (GSM), code division multiple access (CDMA), wideband code division multiple access (WCDMA), universal mobile telecommunications system (UMTS), time division multiple access (TDMA), long term evolution (LTE), 4G, 5G, and 6G.

The short-range communication module which is for short-range communication may support short-range communication by using at least one of Bluetooth™, radio frequency identification (RFID), infrared data association (IrDA), ultra wideband (UWB), ZigBee, near field communication (NFC), wireless-fidelity (Wi-Fi), Wi-Fi Direct, and wireless universal serial bus (USB) technologies.

The input/output terminal 14 is directly connected to at least one field equipment 40 present in the site. The input/output terminal 14 transfers a signal received from the field equipment 40 to the CPU 11 and transfers a computational result of the CPU 11 to the field equipment 40.

Although not illustrated in FIG. 1, the industrial control apparatus 10 may further include an interface which is capable of receiving a command, a request, and data from the user terminal 20 or the central server 30.

The user terminal 20 refers to a terminal apparatus of the user, which takes charge of managing and controlling the industrial control apparatus 10 through a program for management (an application for controlling an industrial control apparatus) provided by the central server 30.

The program for management (hereinafter referred to as a "management program") may include a software development kit (SDK) associated with the dynamic authentication code. The user terminal 20 may perform all operations associated with the dynamic authentication code through the SDK included in the management program.

The central server 30 may receive status information of the field equipment 40 collected by the industrial control apparatus 10 and may perform all the operations of the system by managing and controlling the industrial control apparatuses 10 based on the status information.

The central server 30 may be connected to an OTAC verification server 31 (refer to FIG. 3) for authentication of the industrial control apparatus 10. Alternatively, the central server 30 may include the OTAC verification server 31 for authentication of the industrial control apparatus 10.

The field equipment 40 refers to apparatuses which operate in the site depending on a control command of the industrial control apparatus 10. For example, the field equipment 40 may include, but is not limited to, a motor valve, a switch, and an actuator.

Figure 2:
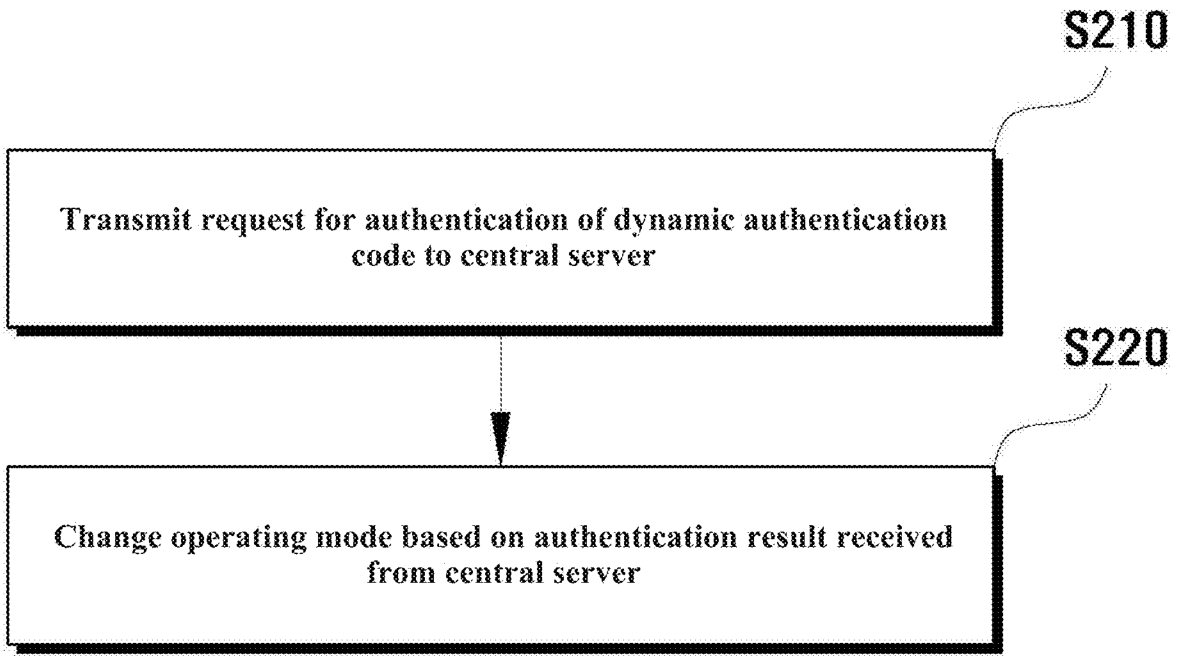
FIG. 2 is a flowchart of a method for performing dynamic authentication code-based authentication according to an embodiment of the present disclosure.

FIG. 2 is a flowchart of a method for performing dynamic authentication code-based authentication according to an embodiment of the present disclosure. The description will be given in FIG. 2 as an operation associated with OTAC verification is performed by the central server 30; however, in detail, the operation associated with the OTAC verification is performed by the OTAC verification server 31.

Referring to FIG. 2, the CPU 11 of the industrial control apparatus 10 may transmit a request for authentication of a dynamic authentication code generated by the user terminal 20 to the central server 30 through the communication module 13 (S210).

For a user responsible for (managing or controlling) the industrial control apparatus 10 to use the industrial control apparatus 10, whether the corresponding user is a user responsible for the industrial control apparatus 10 should be checked.

To this end, the user may transmit an authentication request to the industrial control apparatus 10 through the management program (an application for controlling an industrial control apparatus) installed on the user terminal 20. When the industrial control apparatus 10 transfers the received authentication request to the central server 30, the central server 30 may determine whether the corresponding user is a normal user (i.e., whether the corresponding authentication request corresponds to a normal access).

In detail, when the dynamic authentication code is generated by the user terminal 20 (in detail, the OTAC SDK included in the management program), the user terminal 20 may transmit the authentication request to the industrial control apparatus 10 together with the generated dynamic authentication code.

As described above, the dynamic authentication code generated by the SDK included in an application (the management program) of the user terminal 20 may be transmitted to the industrial control apparatus 10 from the user terminal 20 through the communication. However, in the case where the user directly inputs the dynamic authentication code generated by the SDK to an interface apparatus connected to the industrial control apparatus 10, the industrial control apparatus 10 may obtain the dynamic authentication code; alternatively, in the case where the user allows the interface apparatus to read the dynamic authentication code, the industrial control apparatus 10 may obtain the dynamic authentication code.

When the central server 30 receives the authentication request from the industrial control apparatus 10 together with the dynamic authentication code, whether the authentication request of the user terminal 20 corresponds to a normal access may be determined based on the dynamic authentication code.

The dynamic authentication code may include secret data of the user terminal 20.

The central server 30 may search the received dynamic authentication code for the secret data by using a search algorithm stored in advance. The central server 30 may compare the found secret data and prestored secret data to perform verification for the dynamic authentication code. That is, when the found secret data coincide with the prestored secret data, it may be determined that the dynamic authentication code is a code normally generated at a present point in time.

Herein, the secret data which are generated by the central server 30 when the user terminal 20 requests registration from the management program (an application for controlling an industrial control apparatus) may be a unique value which is only assigned to the user terminal 20 to identify the user terminal 20.

Also, the secret data may be used for the central server 30 to search for identification information of the user. The identification information may be a user identification (ID) which the user inputs through the user terminal 20 or is generated by the user terminal 20, when the user terminal 20 request registration from the management program (an application for controlling an industrial control apparatus). However, the present disclosure is not limited thereto, and the identification information is not limited as long as information (e.g., a password or an employee number) capable of identifying the user.

The central server 30 may complete the user registration by mapping and storing the identification information received from the user terminal 20 and the secret data generated by the central server 30.

The identification information of the user and the secret data of the user terminal 20 may be mapped and stored during the user registration described above; afterwards, whenever the authentication is performed, the central server 30 may search the dynamic authentication code for the secret data of the user terminal 20 and may search for the identification information of the user by using the found secret data. According to the above description, the authentication using the dynamic authentication code may simultaneously perform the authentication for the user and the user terminal (equipment).

Referring to FIG. 2, the CPU 11 of the industrial control apparatus 10 may change an operating mode based on a result of the authentication performed by the central server 30 (S220).

When it is determined by the central server 30 that the authentication request corresponds to a normal access, the CPU 11 may receive the identification information of the user from the central server 30. The CPU 11 may perform login processing of the user based on the received identification information.

When the login is completed, the CPU 11 may change the operating mode of the industrial control apparatus 10 from a disable mode to an enable mode. In a state of the enable mode, the CPU 11 may control at least one field equipment 40 based on a control command received from the user terminal 20.

When it is determined by the central server 30 that the authentication request corresponds to an abnormal access, the CPU 11 may block a terminal requesting the corresponding authentication and may also continue to maintain the operating mode of the disable state.

According to an embodiment, when the authentication request received in a state where the operating mode is enabled corresponds to an abnormal access, the CPU 11 may block the terminal requesting the corresponding authentication and may also switch the operating mode from the enable state to the disable state.

Below, a dynamic authentication code-based authentication process and a user registration process will be sequentially described with reference to FIGS. 3 and 4. An OTAC generation module 21 illustrated in FIGS. 3 and 4 may mean the software development kit (SDK) associated with the dynamic authentication code described above. Also, the OTAC verification server 31 may be mounted (included) in or connected to the central server 30. Also, for convenience, the description is given as the industrial control apparatus 10 performs an operation, but this may be understood as the operation is performed by the CPU 11 included in the industrial control apparatus 10.

Figure 3:
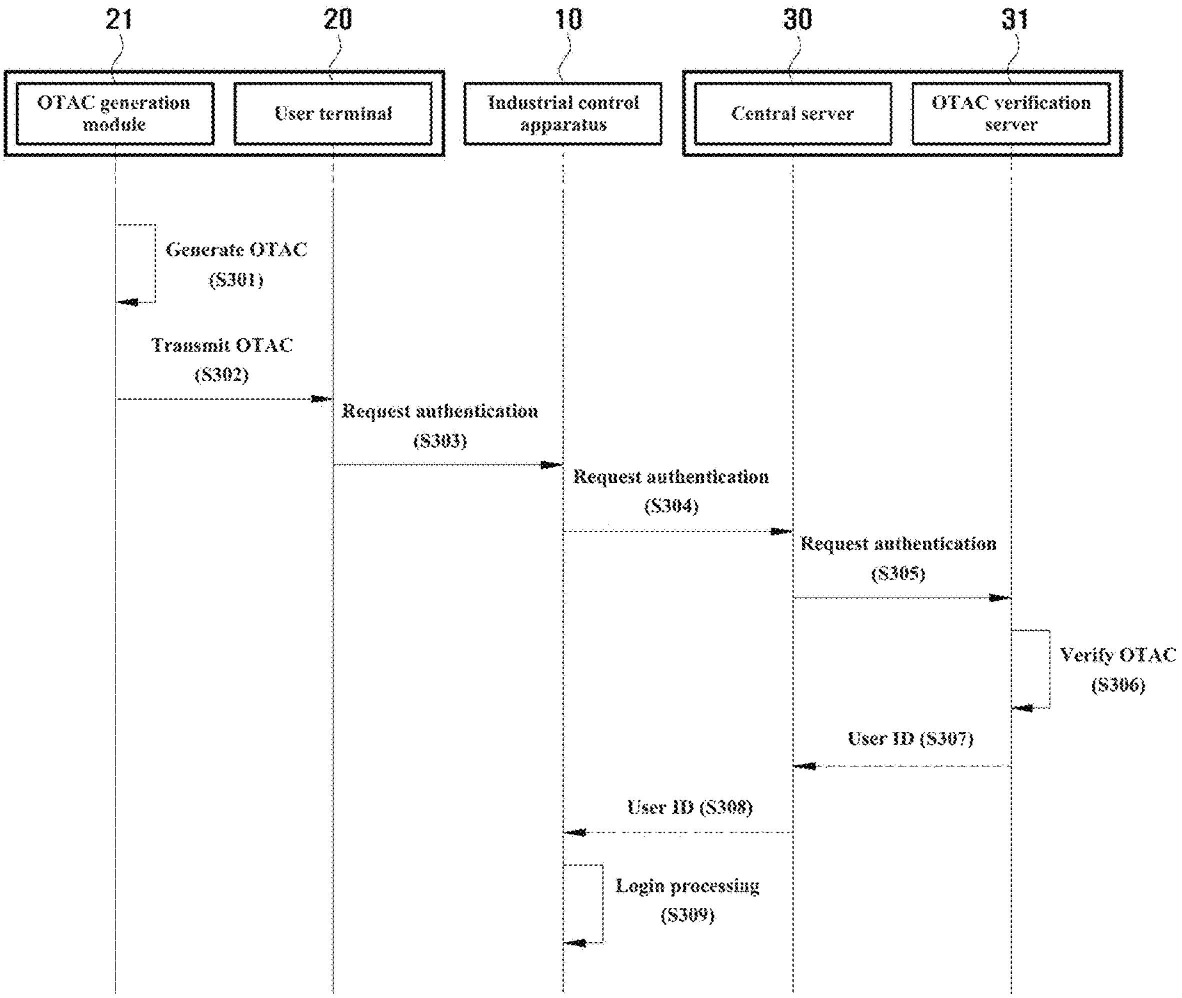
FIG. 3 is a diagram for describing a dynamic authentication code-based authentication process according to an embodiment of the present disclosure.

FIG. 3 is a diagram for describing a dynamic authentication code-based authentication process according to an embodiment of the present disclosure.

Referring to FIG. 3, the OTAC generation module 21 may generate a dynamic authentication code OTAC (S301).

The dynamic authentication code OTAC may be generated by using one or more seed data. The seed data may include, but are not limited to, a unique value of an apparatus (a user terminal or a management program), apparatus information, and time data.

Herein, the unique value of the apparatus means the secret data of the user terminal 20 described above. The unique value of the apparatus refers to a value for identifying the user terminal 20 or the management program installed on the user terminal 20.

The apparatus information may mean, but is not limited to, a serial number of the industrial control apparatus 10.

The time data may mean time data of a point in time when the authentication request is made or a point in time when the dynamic authentication code is generated.

In detail, the dynamic authentication code may be generated based on the one or more seed data by using a code generation function. Herein, the driving of the code generation function may be initiated at a point in time when the user is registered.

Before the OTAC generation module 21 generates a dynamic authentication code, the user may select the industrial control apparatus 10 to be enabled (or logged in) through the user terminal 20. Information of the industrial control apparatus 10 thus selected may be transferred to the OTAC generation module 21 and may be utilized as seed data for generating a dynamic authentication code.

Referring to FIG. 3, the OTAC generation module 21 may transfer the dynamic authentication code OTAC to the user terminal 20 (S302).

The user terminal 20 may request authentication which is based on the dynamic authentication code OTAC, and the corresponding authentication request may be transferred to the OTAC verification server 31 through the industrial control apparatus 10 and the central server 30 (S303, S304, and S305).

In detail, the user terminal 20 may transfer the authentication request to the selected industrial control apparatus 10.

The OTAC verification server 31 may perform the requested authentication through the verification of the dynamic authentication code OTAC (S306).

The OTAC verification server 31 may compare the seed data included in the received dynamic authentication code and prestored seed data and may determine whether the dynamic authentication code is generated by a normal user terminal at a present point in time, depending on whether two values coincide with each other.

According to an embodiment, the OTAC verification server 31 may search for secret data by applying the search algorithm to the dynamic authentication code and may perform verification by comparing the found secret data and the secret data included in the dynamic authentication code.

When a verification result indicates that the two values coincide with each other, that is, that the authentication request corresponds to a normal access, the OTAC verification server 31 may search for the identification information of the user mapped and stored to secret data.

Referring to FIG. 3, the OTAC verification server 31 may transfer the found identification information (i.e., a user ID) to the industrial control apparatus 10 through the central server 30 (S307 and S308).

In detail, the OTAC verification server 31 may provide the found identification information (i.e., a user ID) to the corresponding industrial control apparatus 10, based on information of an industrial control apparatus included in the dynamic authentication code.

Referring to FIG. 3, the industrial control apparatus 10 may perform user login processing by using the received identification information (i.e., a user ID) (S309).

When the login is completed, the industrial control apparatus 10 may enter the enable state, and the user may manage and control the industrial control apparatus 10 by using the user terminal 20.

Figure 4:
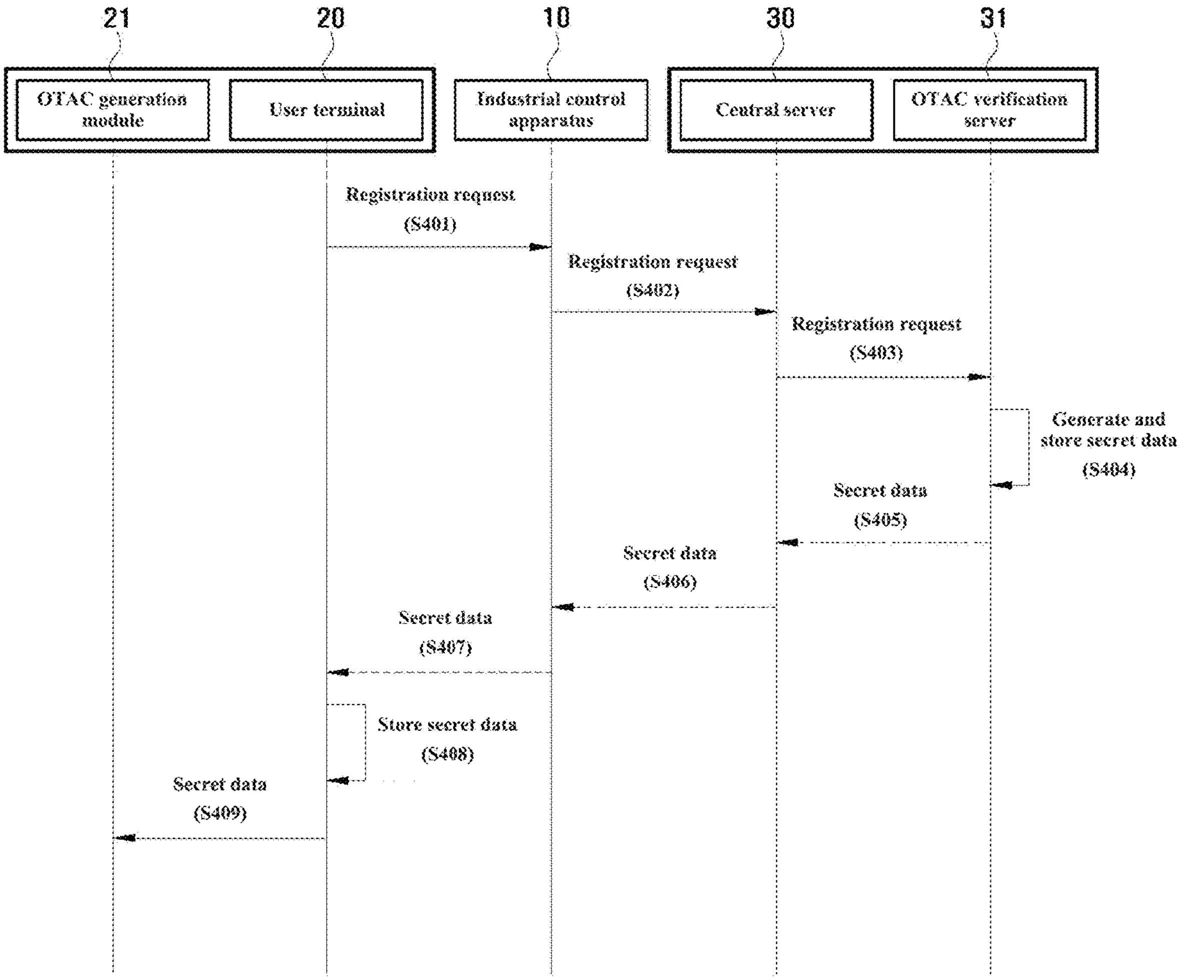
FIG. 4 is a diagram for describing a user registration process according to an embodiment of the present disclosure.

FIG. 4 is a diagram for describing a user registration process according to an embodiment of the present disclosure.

Referring to FIG. 4, the user terminal 20 may request user registration, and the corresponding registration request may be transferred to the OTAC verification server 31 through the industrial control apparatus 10 and the central server 30 (S401, S402, and S403).

The user should perform user registration for the industrial control apparatus 10 which the user is responsible for. In detail, the user may request user registration for the industrial control apparatus 10, which the user will be responsible for, through the management program. In this case, the user may input information of the industrial control apparatus 10, which the user is responsible for, and his/her identification information.

The user terminal 20 may transmit the registration request to the corresponding industrial control apparatus 10 together with the identification information of the user, based on the input information of the industrial control apparatus 10.

Referring to FIG. 4, the OTAC verification server 31 may generate and store secret data for identifying the user terminal 20 (or the management program installed on the user terminal 20) requesting the registration (S404).

In detail, the OTAC verification server 31 may store the generated secret data at a specific storage location in the search algorithm. In this case, the OTAC verification server 31 may map and store the identification information of the user to the secret data stored at the specific storage location. According to an embodiment, as well as the identification information of the user, the information of the industrial control apparatus 10 may also be mapped and stored to the secret data.

As such, the user registration may be completed in the OTAC verification server 31. In this case, the driving of a code generation function associated with the user terminal 20 may be initiated. Accordingly, the OTAC verification server 31 may search for a storage location of secret data in the search algorithm by applying a dynamic authentication code generated by the code generation function to the search algorithm.

Referring to FIG. 4, the OTAC verification server 31 may transfer the secret data to the user terminal 20 through the central server 30 and the industrial control apparatus 10 (S405, S406, and S407).

The user terminal 20 may store the secret data (S408) and may transfer the secret data to the OTAC generation module 21 (S409). Accordingly, the OTAC generation module 21 may generate a dynamic authentication code by using the secret data.

Meanwhile, when a plurality of industrial control apparatuses 10 are managed by the user, different code generation functions may be respectively allocated to the industrial control apparatuses 10. Also, the code generation functions may be driven at different points in times. That is, the driving of the corresponding code generation function may be initiated at a point in time when the user registration for each industrial control apparatus 10 is completed. For example, the driving of code generation function “A” may be initiated at a point in time when user registration for industrial control apparatus “A” is completed, and the driving of code generation function “B” may be initiated at a point in time when user registration for industrial control apparatus “B” is completed. Accordingly, when the user applies the authentication request to control industrial control apparatus “A”, a dynamic authentication code may be generated by using code generation function “A”; when the user applies the authentication request to control industrial control apparatus “B”, a dynamic authentication code may be generated by using code generation function “B”.

Below, a security method of an industrial control apparatus using the industrial control apparatus 10 and the user terminal 20 will be described with respect to FIGS. 5 to 8.

Figure 5:
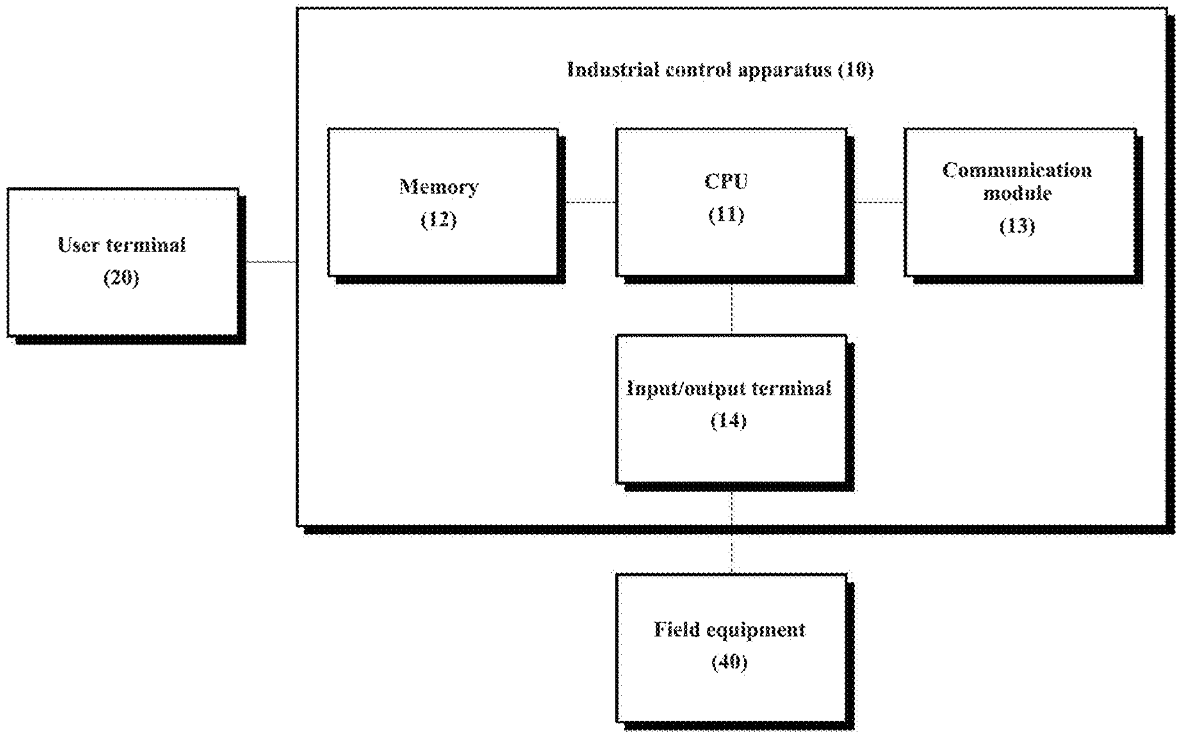
FIG. 5 is a diagram illustrating a security system of an industrial control apparatus using dynamic authentication code-based authentication according to another embodiment of the present disclosure.

FIG. 5 is a diagram illustrating a security system of an industrial control apparatus using dynamic authentication code-based authentication according to another embodiment of the present disclosure.

Referring to FIG. 5, a security system (hereinafter referred to as a “system”) of an industrial control apparatus using dynamic authentication code-based authentication according to another embodiment includes the industrial control apparatus 10, the user terminal 20, and the field equipment 40. However, in some embodiments, the system may include components, the number of which is less than or more than the number of components illustrated in FIG. 5.

The industrial control apparatus 10, the user terminal 20, and the field equipment 40 are described with reference to FIG. 1, and thus, additional description will be omitted to avoid redundancy.

However, an embodiment in which the OTAC verification server 31 for authentication of the industrial control apparatus 10 is included in the central server 30 or is connected thereto is described with reference to FIGS. 1 to 4, but an embodiment in which an OTAC verification server 15 (refer to FIG. 7) for authentication of the industrial control apparatus 10 is included in the industrial control apparatus 10 will be described with reference to FIGS. 5 to 8. Herein, the OTAC verification server 31 and the OTAC verification server 15 perform the same operation.

Figure 6:
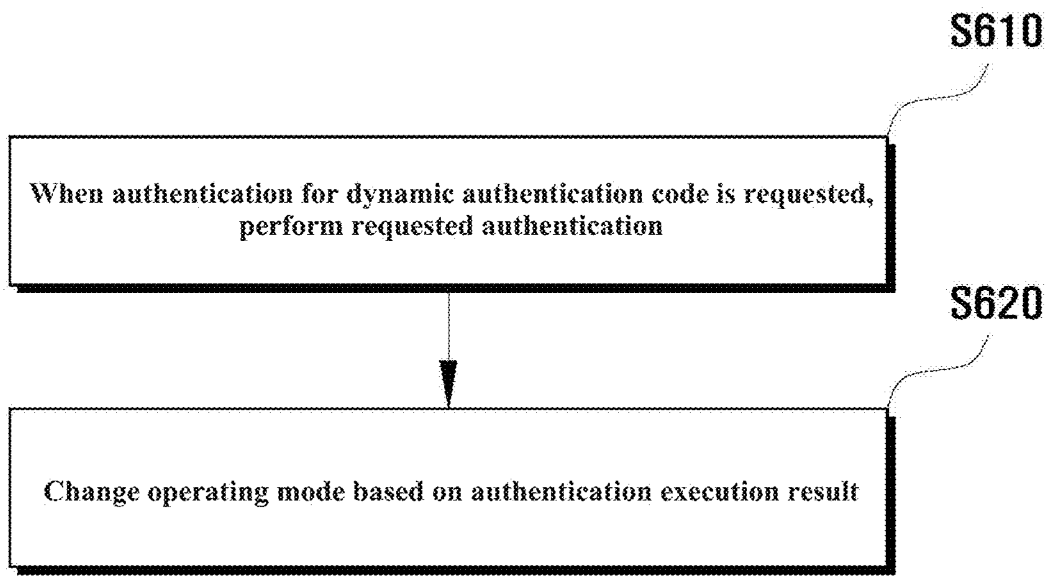
FIG. 6 is a flowchart of a method for performing dynamic authentication code-based authentication according to another embodiment of the present disclosure.

FIG. 6 is a flowchart of a method for performing dynamic authentication code-based authentication according to another embodiment of the present disclosure. The description will be given in FIG. 6 as an operation associated with OTAC verification is performed by the industrial control apparatus 10; however, in detail, the operation associated with the OTAC verification is performed by the OTAC verification server 15.

Referring to FIG. 6, when authentication for a dynamic authentication code generated by the user terminal 20 is requested through the communication module 13, the CPU 11 of the industrial control apparatus 10 may perform the requested authentication (S610).

For a user responsible for (managing or controlling) the industrial control apparatus 10 to use the industrial control apparatus 10, whether the corresponding user is a user responsible for the industrial control apparatus 10 should be checked.

To this end, the user may transmit an authentication request to the industrial control apparatus 10 through the management program (an application for controlling an industrial control apparatus) installed on the user terminal 20. The industrial control apparatus 10 may determine whether the corresponding user is a normal user (i.e., whether the corresponding authentication request corresponds to a normal access), in response to the received authentication request.

In detail, when the dynamic authentication code is generated by the user terminal 20 (in detail, the OTAC SDK included in the management program), the user terminal 20 may transmit the authentication request to the industrial control apparatus 10 together with the generated dynamic authentication code.

As described above, the dynamic authentication code generated by the SDK included in an application (the management program) of the user terminal 20 may be transmitted to the industrial control apparatus 10 from the user terminal 20 through the communication. However, in the case where the user directly inputs the dynamic authentication code generated by the SDK to an interface apparatus connected to the industrial control apparatus 10, the industrial control apparatus 10 may obtain the dynamic authentication code; alternatively, in the case where the user allows the interface apparatus to read the dynamic authentication code, the industrial control apparatus 10 may obtain the dynamic authentication code.

The industrial control apparatus 10 may determine whether the authentication request of the user terminal 20 corresponds to a normal access, based on the dynamic authentication code.

The dynamic authentication code may include secret data of the user terminal 20.

The industrial control apparatus 10 may search the received dynamic authentication code for the secret data by using a search algorithm stored in advance. The industrial control apparatus 10 may compare the found secret data and prestored secret data to perform verification for the dynamic authentication code. That is, when the found secret data coincide with the prestored secret data, it may be determined that the dynamic authentication code is a code normally generated at a present point in time.

Herein, the secret data which are generated by the industrial control apparatus 10 when the user terminal 20 requests registration from the management program (an application for controlling an industrial control apparatus) may be a unique value which is only assigned to the user terminal 20 to identify the user terminal 20.

Also, the secret data may be used for the industrial control apparatus 10 to search for identification information of the user. The identification information may be a user identification (ID) which the user inputs through the user terminal 20 or is generated by the user terminal 20, when the user terminal 20 request registration from the management program (an application for controlling an industrial control apparatus). However, the present disclosure is not limited thereto, and the identification information is not limited as long as information (e.g., a password or an employee number) capable of identifying the user.

The industrial control apparatus 10 may complete the user registration by mapping and storing the identification information received from the user terminal 20 and the secret data generated by the industrial control apparatus 10.

The identification information of the user and the secret data of the user terminal 20 may be mapped and stored during the user registration described above; afterwards, whenever the authentication is performed, the central server 30 may search the dynamic authentication code for the secret data of the user terminal 20 and may search for the identification information of the user by using the found secret data. According to the above description, the authentication using the dynamic authentication code may simultaneously perform the authentication for the user and the user terminal (equipment).

Referring to FIG. 6, the CPU 11 of the industrial control apparatus 10 may change an operating mode based on an execution result of the authentication (S620).

When it is determined that the authentication request corresponds to a normal access, the CPU 11 may perform user login processing based on the found identification information.

When the login is completed, the CPU 11 may change the operating mode of the industrial control apparatus 10 from a disable mode to an enable mode. In a state of the enable mode, the CPU 11 may control at least one field equipment 40 based on a control command received from the user terminal 20.

When it is determined that the authentication request corresponds to an abnormal access, the CPU 11 may block a terminal requesting the corresponding authentication and may also continue to maintain the operating mode of the disable state.

According to an embodiment, when the authentication request received in a state where the operating mode is enabled corresponds to an abnormal access, the CPU 11 may block the terminal requesting the corresponding authentication and may also switch the operating mode from the enable state to the disable state.

Below, a dynamic authentication code-based authentication process and a user registration process will be sequentially described with reference to FIGS. 7 and 8. The OTAC generation module 21 illustrated in FIGS. 7 and 8 may mean the software development kit (SDK) associated with the dynamic authentication code described above. Also, the OTAC verification server 15 may be mounted (included) in or connected to the industrial control apparatus 10. Also, for convenience, the description is given as the industrial control apparatus 10 performs an operation, but this may be understood as the operation is performed by the CPU 11 included in the industrial control apparatus 10.

Figure 7:
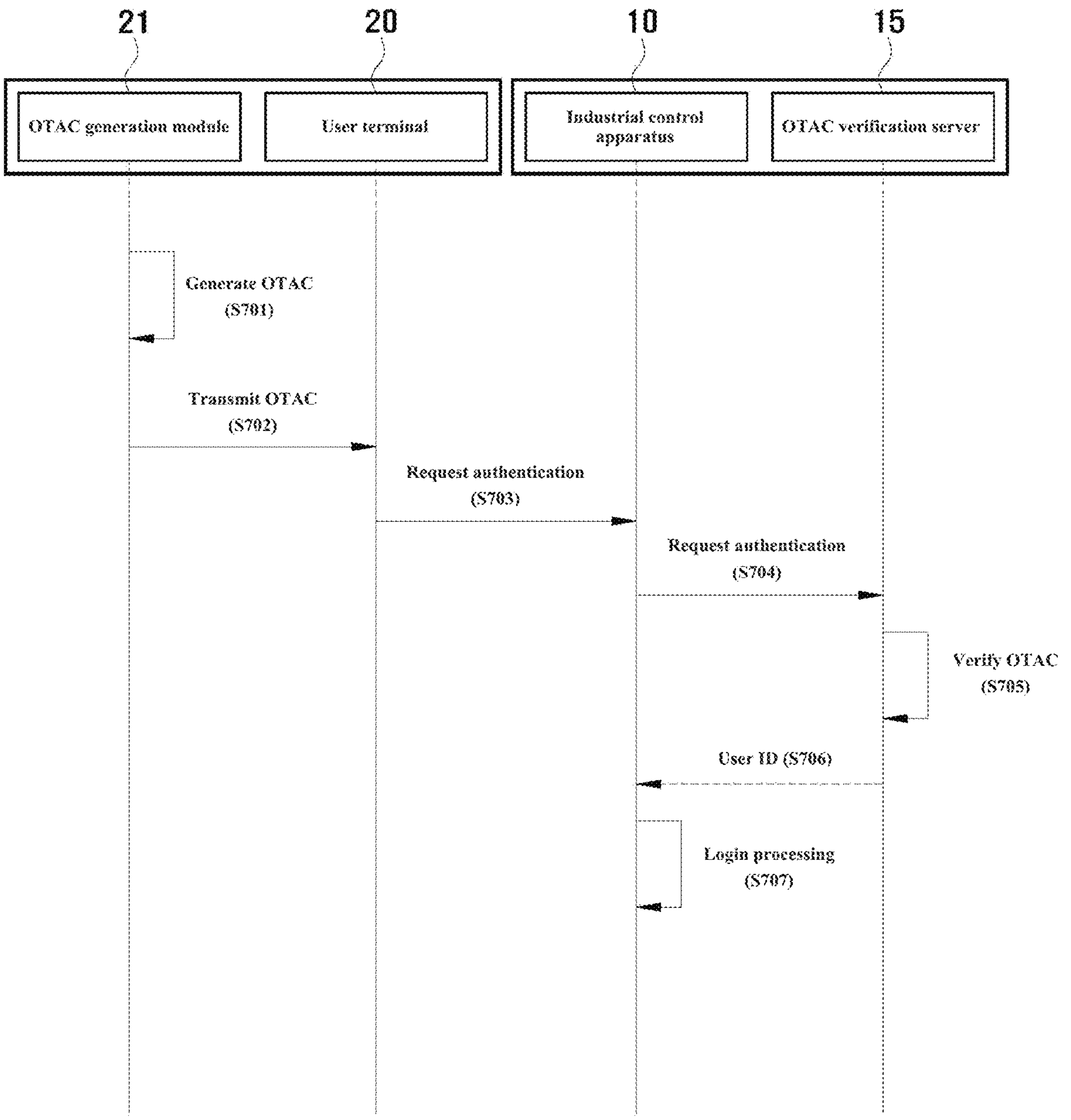
FIG. 7 is a diagram for describing a dynamic authentication code-based authentication process according to another embodiment of the present disclosure.

FIG. 7 is a diagram for describing a dynamic authentication code-based authentication process according to another embodiment of the present disclosure.

Referring to FIG. 7, the OTAC generation module 21 may generate the dynamic authentication code OTAC (S701).

The dynamic authentication code OTAC may be generated by using one or more seed data. The seed data may include, but are not limited to, a unique value of an apparatus (a user terminal or a management program), apparatus information, and time data.

Herein, the unique value of the apparatus means the secret data of the user terminal 20 described above. The unique value of the apparatus refers to a value for identifying the user terminal 20 or the management program installed on the user terminal 20.

The apparatus information may mean, but is not limited to, a serial number of the industrial control apparatus 10.

The time data may mean time data of a point in time when the authentication request is made or a point in time when the dynamic authentication code is generated.

In detail, the dynamic authentication code may be generated based on the one or more seed data by using a code generation function. Herein, the driving of the code generation function may be initiated at a point in time when the user is registered.

Before the OTAC generation module 21 generates a dynamic authentication code, the user may select the industrial control apparatus 10 to be enabled (or logged in) through the user terminal 20. Information of the industrial control apparatus 10 thus selected may be transferred to the OTAC generation module 21 and may be utilized as seed data for generating a dynamic authentication code.

Referring to FIG. 7, the OTAC generation module 21 may transfer the dynamic authentication code OTAC to the user terminal 20 (S702).

The user terminal 20 may request authentication which is based on the dynamic authentication code OTAC, and the corresponding authentication request may be transferred to the OTAC verification server 15 through the industrial control apparatus 10 (S703 and S704).

In detail, the user terminal 20 may transfer the authentication request to the selected industrial control apparatus 10.

The OTAC verification server 15 may perform the requested authentication through the verification of the dynamic authentication code OTAC (S705).

The OTAC verification server 15 may compare the seed data included in the received dynamic authentication code and prestored seed data and may determine whether the dynamic authentication code is generated by a normal user terminal at a present point in time, depending on whether two values coincide with each other.

According to an embodiment, the OTAC verification server 15 may search for secret data by applying the search algorithm to the dynamic authentication code and may perform verification by comparing the found secret data and the secret data included in the dynamic authentication code.

When a verification result indicates that the two values coincide with each other, that is, that the authentication request corresponds to a normal access, the OTAC verification server 15 may search for the identification information of the user mapped and stored to secret data.

Referring to FIG. 7, the OTAC verification server 15 may transfer the found identification information (i.e., a user ID) to the industrial control apparatus 10 (S706).

The industrial control apparatus 10 may perform user login processing by using the received identification information (i.e., a user ID) (S707).

When the login is completed, the industrial control apparatus 10 may enter the enable state, and the user may manage and control the industrial control apparatus 10 by using the user terminal 20.

Figure 8:
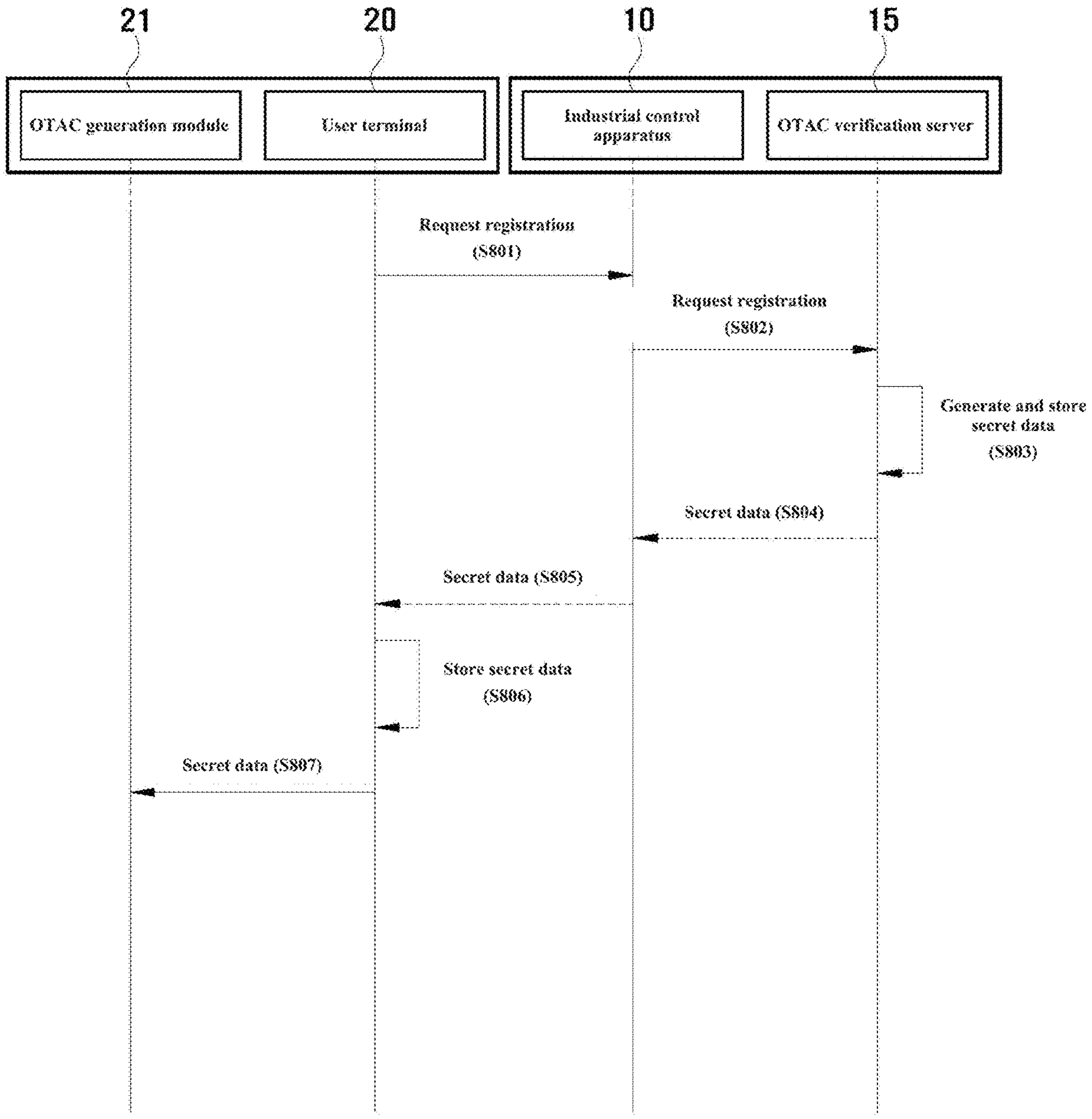
FIG. 8 is a diagram for describing a user registration process according to another embodiment of the present disclosure.

FIG. 8 is a diagram for describing a user registration process according to another embodiment of the present disclosure.

Referring to FIG. 8, the user terminal 20 may request user registration, and the corresponding registration request may be transferred to the OTAC verification server 15 through the industrial control apparatus 10 (S801 and S802).

The user should perform user registration for the industrial control apparatus 10 which the user is responsible for. In detail, the user may request user registration for the industrial control apparatus 10, which the user will be responsible for, through the management program. In this case, the user may input information of the industrial control apparatus 10, which the user is responsible for, and his/her identification information.

The user terminal 20 may transmit the registration request to the corresponding industrial control apparatus 10 together with the identification information of the user, based on the input information of the industrial control apparatus 10.

Referring to FIG. 8, the OTAC verification server 15 may generate and store secret data for identifying the user terminal 20 (or the management program installed on the user terminal 20) requesting the registration (S803).

In detail, the OTAC verification server 15 may store the generated secret data at a specific storage location in the search algorithm. In this case, the OTAC verification server 15 may map and store the identification information of the user to the secret data stored at the specific storage location. According to an embodiment, as well as the identification information of the user, the information of the industrial control apparatus 10 may also be mapped and stored to the secret data.

As such, the user registration may be completed in the OTAC verification server 15. In this case, the driving of a code generation function associated with the user terminal 20 may be initiated. Accordingly, the OTAC verification server 15 may search for a storage location of secret data in the search algorithm by applying a dynamic authentication code generated by the code generation function to the search algorithm.

Referring to FIG. 8, the OTAC verification server 15 may transfer the secret data to the user terminal 20 through the industrial control apparatus 10 (S804 and S805).

The user terminal 20 may store the secret data (S806) and may transfer the secret data to the OTAC generation module 21 (S807). Accordingly, the OTAC generation module 21 may generate a dynamic authentication code by using the secret data.

In the embodiment described with reference to FIGS. 5 to 8, a network connection is required only when the user terminal 20 transfers the dynamic authentication code to the industrial control apparatus 10. That is, because the verification of the dynamic authentication code and the control of the industrial control apparatus 10 according to a result of the verification are performed by one apparatus (the industrial control apparatus 10 or the OTAC verification server 15 included in the industrial control apparatus 10), the two-way communication is not required.

Meanwhile, when a plurality of industrial control apparatuses 10 are managed by the user, different code generation functions may be respectively allocated to the industrial control apparatuses 10. Also, the code generation functions may be driven at different points in times. That is, the driving of the corresponding code generation function may be initiated at a point in time when the user registration for each industrial control apparatus 10 is completed. For example, the driving of code generation function "A" may be initiated at a point in time when user registration for industrial control apparatus "A" is completed, and the driving of code generation function "B" may be initiated at a point in time when user registration for industrial control apparatus "B" is completed. Accordingly, when the user applies the authentication request to control industrial control apparatus "A", a dynamic authentication code may be generated by using code generation function "A"; when the user applies the authentication request to control industrial control apparatus "B", a dynamic authentication code may be generated by using code generation function "B".

Below, a method in which the OTAC generation module 21 generates a dynamic authentication code will be described in detail.

The SDK installed on the management program may generate one detailed code or a plurality of detailed codes. The detailed code means some of codes constituting the dynamic authentication code. The dynamic authentication code may be implemented only with detailed codes; alternatively, the dynamic authentication code may be implemented in the form of a final dynamic authentication code OTAC by combining one or plural detailed codes with a virtual security code generated by an OTP function.

The SDK includes a code generation function for generating the dynamic authentication code. The code generation function includes a detailed code generation function which generates one or more detailed codes and a detailed code combination function (i.e., a rule for combining a plurality of detailed codes) which generates a virtual code by combining the detailed codes.

That is, when the dynamic authentication code includes a plurality of detailed codes, the code generation function generates the plurality of detailed codes by using a plurality of detailed code generation functions and generates the dynamic authentication code by combining the plurality of detailed codes through the detailed code combination function such that a preset combination is implemented.

The plurality of detailed codes have a correlation which is used for the OTAC verification server 15 or 31 to search for a storage location of information capable of identifying a user or an apparatus. That is, the OTAC verification server 15 or 31 includes a search algorithm, and the search algorithm extracts a plurality of detailed codes included in the dynamic authentication code and searches for a storage location of a unique value (e.g., secret data) allocated to the user or the apparatus based on the correlation of the plurality of detailed codes. As an embodiment of the correlation which the plurality of detailed codes have, the search algorithm may search for the storage location of the unique value (e.g., secret data) of the user or the apparatus by computing information capable of reaching a storage location of a unique value of the user or the apparatus based on the correlation between the plurality of detailed codes. In this case, the waypoint may include one or plural waypoints, and there is no limit to the number and order.

Also, as an embodiment of a plurality of detailed codes, the plurality of detailed codes may include a first code and a second code, and the SDK includes a first function and a second function as the detailed code generation function to generate the first code and the second code. The first code and the second code have a correlation for searching for the storage location of the identification information of the user or the apparatus within the OTAC verification server 15 or 31. However, the SDK may only include the first function for generating the first code and the second function for generating the second code as the detailed code generation function to improve the security and may not include data for the correlation between the first code and the second code.

As a specific example of the correlation between the first code and the second code, each of the first code and the second code may be used to search for the storage location of the identification information. That is, the first code may include information about the waypoint, and the second code may include information necessary for calculation capable of being reached from the waypoint to the storage location of the identification information.

Meanwhile, in an embodiment of the present disclosure, the first code may be generated based on a first count, and the second code may be generated based on a second count. In this case, the first count may indicate the number of unit counts corresponding to a time interval from an initial point in time when the code generation function is driven by the OTAC generation module 21 or the OTAC verification server 15 or 31 to a point in time when the dynamic authentication code is generated, and the second count may include the number of unit counts corresponding to a time passing from a point in time when a unique value (e.g., secret data) of a user or an apparatus is stored in the OTAC verification server 15 or 31.

That is, a first function which generates the first code refers to a function which provides a specific code value corresponding to the first count, and a second function which generates the second code refers to a function which provides a specific code value corresponding to the second count.

Below, a method in which the OTAC generation module 21 generates a dynamic authentication code will be described in detail.

In an embodiment of the present disclosure, when the OTAC verification server 15 or 31 receives the dynamic authentication code from the user terminal 20, the OTAC verification server 15 or 31 may verify the dynamic authentication code by comparing data associated with a time when the dynamic authentication code is received and time data of the dynamic authentication code.

In detail, the OTAC verification server 15 or 31 verifies whether the dynamic authentication code is normally generated. That is, after the OTAC verification server 15 or 31 receives the dynamic authentication code, the OTAC verification server 15 or 31 determines whether the dynamic authentication code is normal, by determining whether the received dynamic authentication code is normally generated at a present point in time, based on information (i.e., a code generation function and seed data) stored in the OTAC verification server 15 or 31. The OTAC verification server 15 or 31 searches for a count corresponding to a point in time when the dynamic authentication code is generated, by applying an inverse function of the code generation function to the dynamic authentication code. Due to a transmission time or delay of the dynamic authentication code, there may be a difference between a point in time when the dynamic authentication code is generated and a point in time when the OTAC verification server 15 or 31 receives the dynamic authentication code; in this case, because a count at which the OTAC verification server 15 or 31 receives the dynamic authentication code is different from a count at which the OTAC verification server 15 or 31 generates an OTP number corresponding to a virtual code for authentication, the OTAC verification server 15 or 31 permits an error range from the count at which the dynamic authentication code is received.

Meanwhile, in an embodiment of the present disclosure, the OTAC verification server 15 or 31 may search for a storage location of a unique value (e.g., secret data) of a user or an apparatus based on the dynamic authentication code, may extract the unique value, and may perform user or apparatus authentication based on the extracted unique value.

FIGS. 2 and 6 show steps which are sequentially executed, but this is merely illustrative of the technical idea of the present disclosure. One skilled in the art to which an embodiment of the present disclosure belongs may apply various modifications and variations by changing and performing the order of steps illustrated in FIGS. 2 and 6 or performing steps in parallel without departing from the essential characteristics of the embodiment of the present disclosure, and thus, steps illustrated in FIGS. 2 and 6 are not limited to a time-series order.

Meanwhile, in the above description, operations in FIGS. 2 and 6 may be further divided into additional operations or may be combined into fewer operations, according to an embodiment of the present disclosure. Also, some steps or operations may be omitted as needed, and the order between steps or operations may be changed.

Meanwhile, the disclosed embodiments may be implemented in the form of a recording medium storing instructions executable by a computer. The instructions may be stored in the form of a program code, and the instructions, when executed by a processor, may generate a program module to perform the operations of the disclosed embodiments. The recording medium may be implemented with a computer-readable recording medium.

The computer-readable recording medium includes all types of recording media storing instructions capable of being interpreted by the computer. For example, there may be a read only memory (ROM), a random access memory (RAM), a magnetic tape, a magnetic disk, a flash memory, an optical data storage apparatus, etc.

According to the present disclosure, it is possible to authenticate a user and equipment through an industrial control apparatus or an OTAC server included in a central server Also, only a user and equipment authenticated by utilizing an OTAC authentication method are accessible to the industrial control apparatus.

Also, it is possible to control an access from an external terminal through a dynamic authentication code (OTAC) differently generated each time.

Also, the cost burden is small because there is no need to modify a conventional password (PW) interface used for authentication of an existing industrial control apparatus and it is possible to minimize the change and management of an existing system.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:

1. An industrial control apparatus which performs dynamic authentication code-based authentication, comprising:

a processor configured to:

perform communication with a user terminal and a central server through a communication module of the industrial control apparatus; and transmit an authentication request of a dynamic authentication code generated by the user terminal to the central server, and change an operating mode based on a result of the authentication executed by the central server, wherein the central server is configured to perform the authentication of the user terminal based on the dynamic authentication code, wherein the dynamic authentication code is received from the user terminal, is input by a user through an interface apparatus, or is read through the interface apparatus, wherein the dynamic authentication code is generated by using seed data and a code generation function, wherein driving of the code generation function is initiated at a point in time when the user is registered, wherein the seed data includes a unique value of the user terminal or a management program installed on the user terminal, apparatus information, and time data, wherein the unique value of the user terminal is a value for identifying the user terminal or the management program installed on the user terminal, wherein the apparatus information is a serial number of the industrial control apparatus assigned to hardware of the industrial control apparatus and stored in a memory of the industrial control apparatus, wherein the time data indicates a point in time when the authentication request is made or a point in time when the dynamic authentication code is generated, and wherein the serial number is read by the processor from the memory of the industrial control apparatus and is combined with the unique value of the user terminal and time data to form the seed data so that the seed data uniquely corresponds to both the industrial control apparatus and the user terminal, and wherein the code generation function uses this seed data to generate the dynamic authentication code.

2. The industrial control apparatus of claim 1, wherein, when the authentication is performed by the central server, the processor receives identification information of the user from the central server and performs login processing based on the identification information.

3. The industrial control apparatus of claim 2, wherein the dynamic authentication code includes secret data of the user terminal, and wherein the secret data are used for the central server to search for the identification information.

4. The industrial control apparatus of claim 3, wherein the secret data are a unique value which is generated by the central server when the user terminal requests registration from an application for controlling the industrial control apparatus and is allocated only to the user terminal to identify the user terminal.

5. The industrial control apparatus of claim 2, wherein the identification information is a user identification (ID) which is input or generated by the user terminal when the user terminal requests registration from an application for controlling the industrial control apparatus.

6. The industrial control apparatus of claim 2, wherein, when the login is completed, the processor changes the operating mode from a disable mode to an enable mode and controls at least one field equipment based on a control command received from the user terminal in a state of the enable mode.

7. The industrial control apparatus of claim 1, wherein the processor is further configured to operate the industrial control apparatus in a disable mode prior to authentication, wherein in the disable mode the processor blocks execution of control commands received from the user terminal and prevents control of field equipment connected to the industrial control apparatus, and wherein upon successful authentication the processor changes the operating mode from the disable mode to an enable mode and permits execution of the control commands received from the user terminal to control the field equipment.

8. An industrial control apparatus which performs dynamic authentication code-based authentication, comprising:

a processor configured to perform communication with a user terminal, wherein, when an authentication for a dynamic authentication code generated by the user terminal is requested, the processor changes an operating mode based on an execution result of the authentication, wherein the authentication is to be performed by a central server based on the dynamic authentication code transmitted through a communication module of the industrial control apparatus, wherein the dynamic authentication code is received from the user terminal, is input by a user through an interface apparatus, or is read through the interface apparatus, wherein the dynamic authentication code is generated by using seed data and a code generation function, wherein driving of the code generation function is initiated at a point in time when the user is registered, wherein the seed data includes a unique value of the user terminal or a management program installed on the user terminal, apparatus information, and time data, wherein the unique value of the user terminal is a value for identifying the user terminal or the management program installed on the user terminal, wherein the apparatus information is a serial number of the industrial control apparatus assigned to hardware of the industrial control apparatus and stored in a memory of the industrial control apparatus, wherein the time data indicates a point in time when the authentication request is made or a point in time when the dynamic authentication code is generated wherein the serial number is read by the processor from the memory of the industrial control apparatus and is combined with the unique value of the user terminal and time data to form the seed data so that the seed data uniquely corresponds to both the industrial control apparatus and the user terminal, and wherein the code generation function uses this seed data to generate the dynamic authentication code.

9. The industrial control apparatus of claim 8, wherein, when the authentication is performed by the central server, the processor performs login processing based on identification information of the user, and wherein, when the login is completed, the processor changes the operating mode from a disable mode to an enable mode and controls at least one field equipment based on a control command received from the user terminal in a state of the enable mode.

10. A method which is performed by an industrial control apparatus to perform dynamic authentication code-based authentication, the method comprising:

transmitting a request for authentication of a dynamic authentication code generated by a user terminal to a central server; and changing an operating mode based on a result of the authentication performed by the central server, wherein the authentication is to be performed by the central server based on the dynamic authentication code transmitted through a communication module of the industrial control apparatus, wherein the dynamic authentication code is received from the user terminal, is input by a user through an interface apparatus, or is read through the interface apparatus, wherein the dynamic authentication code is generated by using seed data and a code generation function, wherein driving of the code generation function is initiated at a point in time when the user is registered, wherein the seed data includes a unique value of the user terminal or a management program installed on the user terminal, apparatus information, and time data, wherein the unique value of the user terminal is a value for identifying the user terminal or the management program installed on the user terminal, wherein the apparatus information is a serial number of the industrial control apparatus assigned to hardware of the industrial control apparatus and stored in a memory of the industrial control apparatus, wherein the time data indicates a point in time when the authentication request is made or a point in time when the dynamic authentication code is generated, and wherein the serial number is read from the memory of the industrial control apparatus and is combined with the unique value of the user terminal and time data to form the seed data so that the seed data uniquely corresponds to both the industrial control apparatus and the user terminal, and wherein the code generation function uses this seed data to generate the dynamic authentication code.

11. A method which is performed by an industrial control apparatus to perform dynamic authentication code-based authentication, the method comprising:

when authentication for a dynamic authentication code generated by a user terminal is requested, performing the requested authentication; and changing an operating mode based on an execution result of the authentication, wherein the authentication is to be performed by a central server based on the dynamic authentication code transmitted through a communication module of the industrial control apparatus, wherein the dynamic authentication code is received from the user terminal, is input by a user through an interface apparatus, or is read through the interface apparatus, wherein the dynamic authentication code is generated by using seed data and a code generation function, wherein driving of the code generation function is initiated at a point in time when the user is registered, wherein the seed data includes a unique value of the user terminal or a management program installed on the user terminal, apparatus information, and time data, wherein the unique value of the user terminal is a value for identifying the user terminal or the management program installed on the user terminal, wherein the apparatus information is a serial number of the industrial control apparatus assigned to hardware of the industrial control apparatus and stored in a memory of the industrial control apparatus, wherein the time data indicates a point in time when the authentication request is made or a point in time when the dynamic authentication code is generated, wherein the serial number is read from the memory of the industrial control apparatus and is combined with the unique value of the user terminal and time data to form the seed data so that the seed data uniquely corresponds to both the industrial control apparatus and the user terminal, and wherein the code generation function uses this seed data to generate the dynamic authentication code.

* * * * *